United States Patent [19]

Cherkas et al.

[11] Patent Number: 4,626,307
[45] Date of Patent: Dec. 2, 1986

[54] MACHINE AND METHOD FOR ASSEMBLING PLEATED FILTER MATERIAL AND A HOLLOW CORE MEMBER

[75] Inventors: Paul Cherkas, Saratoga; Joel L. Fritsche, Sunnyvale, both of Calif.; John J. Groezinger, Dunlap, Ill.; Paul D. LaGorce, Oakland, Calif.; Ronald W. Streitmatter, Toulon, Ill.

[73] Assignee: Caterpillar Inc., Peoria, Ill.

[21] Appl. No.: 812,679

[22] Filed: Dec. 23, 1985

[51] Int. Cl.$^4$ ............................................. B31F 1/00
[52] U.S. Cl. ...................................... 156/218; 55/498; 55/500; 55/521; 55/524; 55/DIG. 5; 156/292; 156/466; 210/457; 210/493.5; 210/497.01; 493/276; 493/941
[58] Field of Search ............... 55/498, 500, 521, 524, 55/DIG. 5; 156/210, 218, 292, 443, 466, 474; 210/457, 484, 487, 493.5, 497.01; 428/181; 493/276, 941

[56] References Cited

U.S. PATENT DOCUMENTS

| | | | |
|---|---|---|---|
| 3,241,680 | 3/1966 | Humbert | 210/484 |
| 3,306,794 | 2/1967 | Humbert | 156/474 X |
| 3,716,436 | 2/1973 | Pall et al. | 156/218 |
| 3,948,712 | 4/1976 | Stannard | 156/218 |

*Primary Examiner*—Robert A. Dawson
*Attorney, Agent, or Firm*—Robert A. McFall

[57] ABSTRACT

An automatic assembly machine for assembling a pleated filter material and a perforate hollow core member includes a wrapping station, an adhesive application station and a clamping station. A conveyor moves the filter material and the core member together as a unit through the wrapping station and the adhesive application station. The clamping station both clamps the seam to which adhesive has been applied for a period of time sufficient to permit curing of the adhesive joint, and simultaneously conveys the filter material and core member assembly. A method for assembling a pleated filter material and a perforate hollow core member includes the steps of conveying both the filter material and the hollow core member to a point where they come in mutual contact, supporting one of the members on the other, and simultaneously conveying the filter material and core member sequentially through a wrapping station and an adhesive application station. At the wrapping station the filter material is formed about the core member and the free ends of opposed end pleats are brought into juxtaposition. An adhesive material is applied to selected apposite surfaces at the adhesive application station. Following the application of adhesive material the apposite surfaces are clamped together for a period of time sufficient to permit curing of the adhesively joined surfaces and, simultaneously therewith, the assembled elements are conveyed as a unit.

15 Claims, 7 Drawing Figures

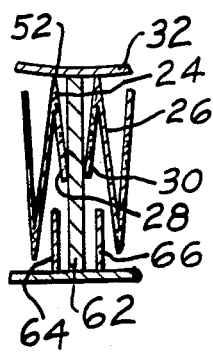
FIG_2_
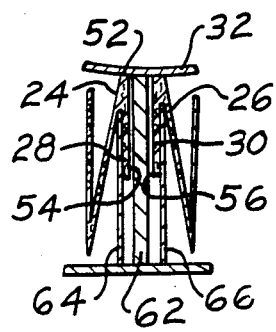
FIG_3_
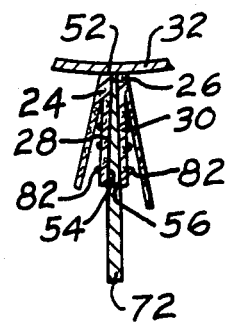
FIG_4_
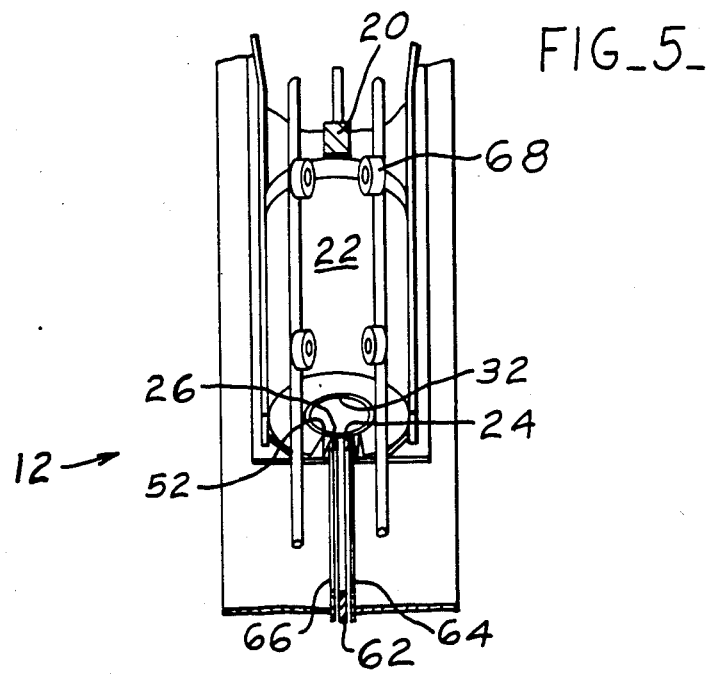
FIG_5_

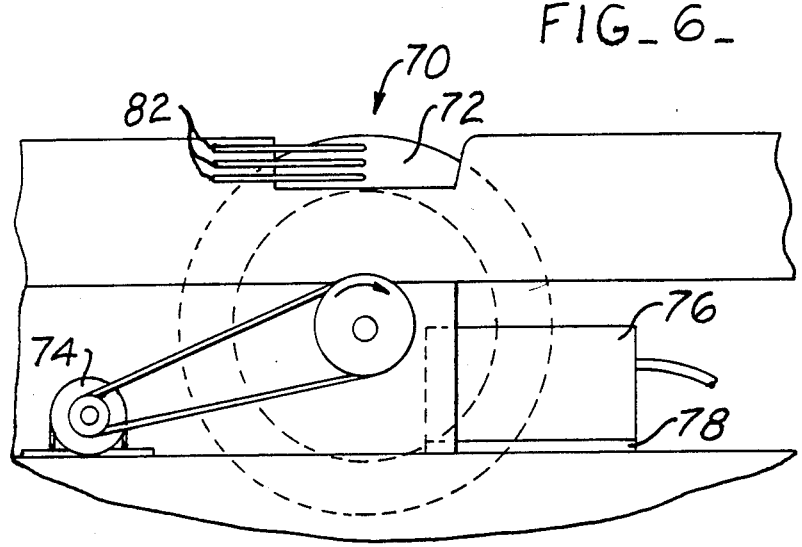
FIG_6_
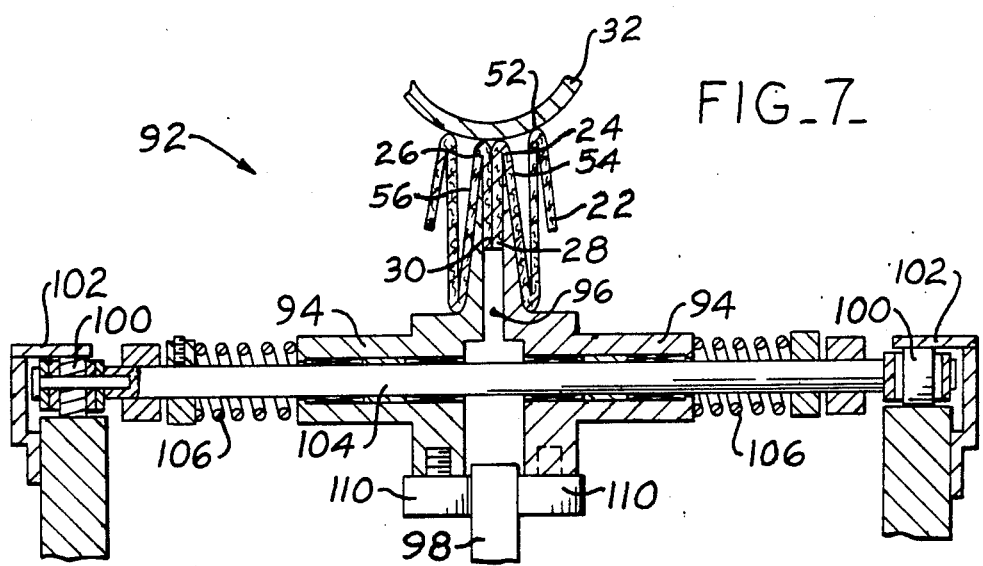
FIG_7_

MACHINE AND METHOD FOR ASSEMBLING PLEATED FILTER MATERIAL AND A HOLLOW CORE MEMBER

DESCRIPTION

1. Technical Field

This invention relates generally to a machine and method for assembling pleated filter material and a hollow core member and more particularly to such a machine and method wherein the free ends of a pleated filter material are adhesively joined and clamped subsequent to wrapping the filter material about the core member.

2. Background Art

Heretofore the wrapping of pleated filter material around a perforate center member, and the securing together of the longitudinal free ends of the pleated material, has been performed largely by hand assembly and is therefore a very labor-intensive, and consequently costly, operation.

One such method for assembling a pleated filter paper and a core is disclosed in U.S. Pat. No. 3,241,680 issued Mar. 22, 1966 to K. E. Humbert, Jr. Humbert teaches that the free ends of the paper be first fastened together such as by cementing, stitching or stapling to form an annular pack of filter material. The annular pack is then placed over and around a perforated center tube to complete the assembly. In this method of assembly, a problem is encountered in that after forming into an annular shape, it is difficult to maintain the pack in a true annular shape. Specifically, the internal edges of the pleats are unsupported, and tend to collapse toward the center of the annulus. As a result, the pleats may tear or otherwise become damaged during the assembly process.

The present invention is directed to overcoming one or more of the problems set forth above. In particular, an assembly machine embodying the present invention automatically sequentially wraps a pleated filter material about a hollow core member, applies adhesive to at least one of the free ends of the end pleats, and then while conveying the assembled elements, clamps the adhesive joint thus formed for a period of time sufficient to permit the joint to develop set strength.

DISCLOSURE OF THE INVENTION

In accordance with one aspect of the present invention, a machine for assembling a pleated filter and a perforate hollow core member includes a wrapping station, an adhesive application station, and a clamping station. The wrapping station includes means for wrapping a pack of pleated filter material about the core member and bringing the free ends of the end pleats into a closely spaced side by side relationship. The adhesive application station includes means for applying an adhesive material to a surface of at least one of the free ends of the end pleats. The end pleats are clamped together by means provided at the clamping station which simultaneously conveys the filter material and core member assembly while continuing the clamping together of the free ends.

In another aspect of the present invention, a method for assembling a pleated filter material and a perforate hollow core member includes the steps of conveying a rectangularly shaped pack of longitudinally pleated filter material having a predetermined number of pleats uniformly spaced between opposed end pleats each having a free end, and a perforate hollow core member. After bringing the filter material and core member into contact and supporting one on the other, the pack of filter material is formed about the core member and free end of the end pleats brought into juxtaposition. An adhesive material is applied to an opposed surface of at least one of the juxtaposed free ends and the ends are clamped together. The assembled pack of filter material and core member is conveyed simultaneously with maintaining a clamping force on the joined free end surfaces for a period of time sufficient to permit curing of the adhesively bonded joint therebetween.

BRIEF DESCRIPTION OF THE DRAWING

FIG. 2 is a schematic cross-section taken along the line II—II of FIG. 1 showing initial separation of the free end of the end pleats;

FIG. 3 is a schematic cross-section taken along the line III—III of FIG. 1 showing support of the free ends and positioning of opposed surfaces of the free ends in juxtaposition;

FIG. 4 is a schematic cross-section taken along the line IV—IV of FIG. 1, showing application of adhesive to apposed free end surfaces.

FIG. 5 is an isometric top view of a portion of the wrapping station;

FIG. 6 is a partial side view of the adhesive application station; and

FIG. 7 is a sectional view of the clamping station taking along the line VII—VII of FIG. 1.

BEST MODE FOR CARRYING OUT THE INVENTION

Figure 1:
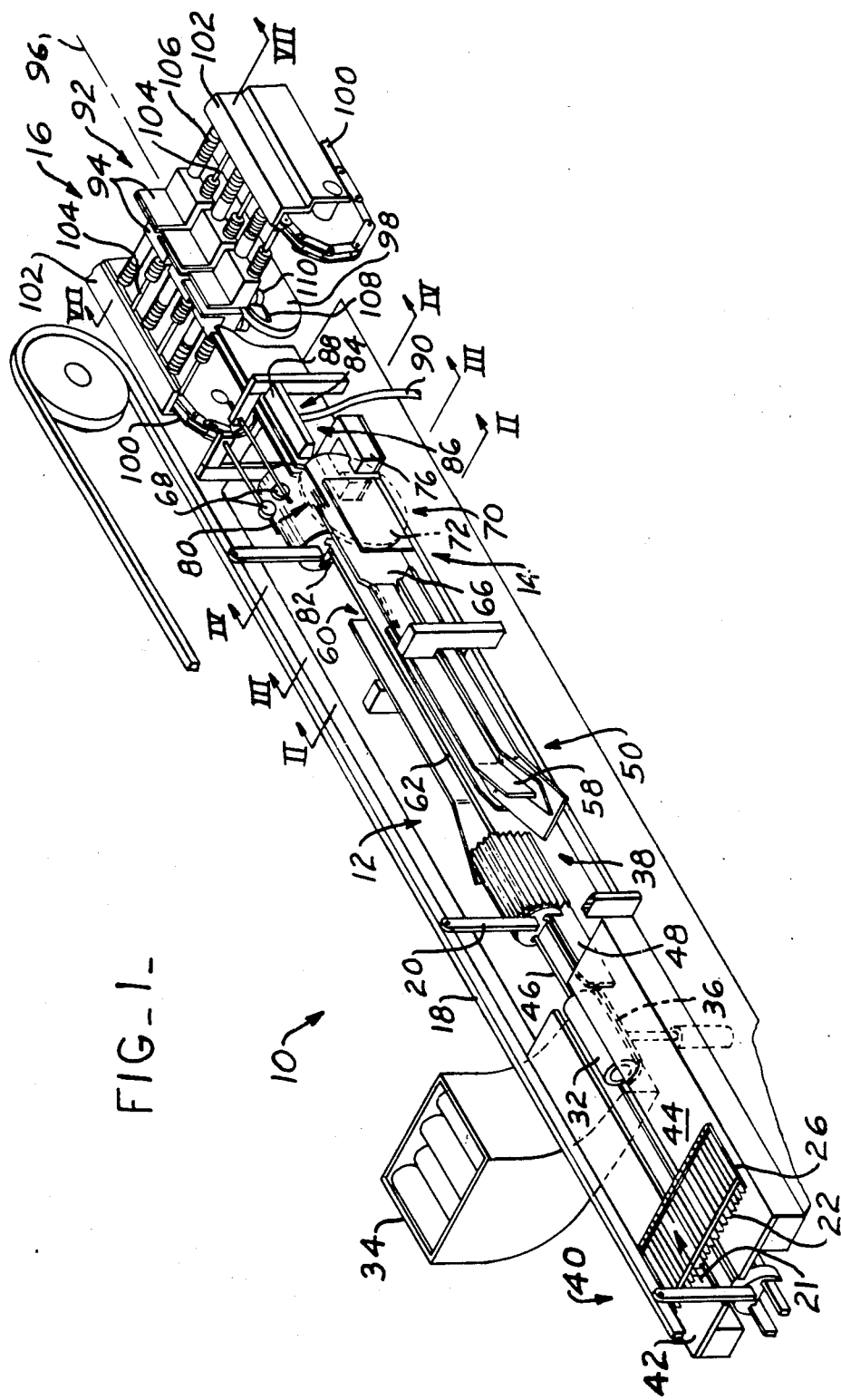
FIG. 1 is a shortened isometric view of a pleated filter and core member assembly machine embodying the present invention.

A pleated filter and perforate hollow core member assembly machine 10 includes a wrapping station 12, an adhesive application station 14, and a clamping station 16. A powered chain conveyor 18 carrying a plurality of suspended pusher arms 20, in the direction indicated by the directional arrow 21, extends from a filter material entry end 40 of the assembly machine 10 to the clamping station 16. One of the pusher arms 20 engages the transverse edge of a rectangularly shaped pack of longitudinally pleated filter material 22 having a predetermined number of pleats uniformly spaced between opposed end pleats 24,26 respectively having a free end 28,30, as best shown in FIGS. 2-4, and moves the pleated material 22 into alignment with a perforate hollow core member 32.

The hollow core member 32 is conveyed from a storage buffer 34 to a position elevationally below the conveyance plane of the filter material 22 and is centered and lifted into the plane of travel of the filter material by an air cylinder-operated cradle 36, whereupon the pusher arm 20 engages the core member and simultaneously moves the core member and filter material toward an entry end 38 of the wrapping station 12. During travel from the entry end 40 of the assembly machine 10 to the core member pick up position, the filter material 22 is elevationally supported by a pair of horizontally disposed flat plates 42, 44. After mating with the core member 32, the filter material 22 is elevationally supported in draped fashion on the core member which, in turn, is elevationally supported and guided to the wrapping station 12 by a pair of guide bars 46, 48.

Means 50 are provided at the wrapping station 12 for wrapping the longitudinally pleated filter material 22 in cylindrical fashion about the hollow core member 32 such that the radially inner edges 52 of the pleats are urged into contact with the core member and the free ends 28,30 of the respective end pleats 24,26 are brought into juxtaposition; i.e., apposite surfaces 54,56 respectively of the free ends 28,30 are brought into side by side closely-spaced alignment with respect to each other. The wrapping means 50 includes a plurality of guide members 58 which are arranged in converging relationship from the entry end 38 to an exit end 60 of the wrapping station 12. The guide members 58 are arranged to uniformly shape the filter pack 22 into an annulus about the core member 32 as the filter material and core member are conveyed through the wrapping station by the pusher arm 20. The guide members 58 could alternatively be formed of one or more frustoconically-shaped sections. Further, the wrapping means 50 includes a longitudinal guide bar 62 extending through the wrapping station 12 and, as best shown in FIGS. 2–4, a pair of guide plates 64,66 extending generally parallel with respect to the longitudinal guide bar 62 and disposed respectively on opposite lateral sides of the longitudinal guide bar in closely spaced relationship thereto. A plurality of rollers 68 are mounted in spaced relationship to the longitudinal guide bar 62 and cooperate with the guide members 58 to urge the inner edges 52 of the pleats of the filter material into contact with the core member 32.

At the adhesive application station 14, means 70 are provided for applying an adhesive material to at least one of the apposite surfaces 54,56 of the free ends 28,30. Preferably the adhesive application means includes a heated disk 72 rotatably mounted at the adhesive application station 14 for rotation in a plane parallel with, and centered between, the apposite surfaces 54,56 of the juxtaposed free ends 28,30 as the wrapped assembly is conveyed through the adhesive application station by the pusher arm 20. The disk 72 may be conveniently heated by an electrically resistive heating element mounted adjacent the disk or by internally disposed heating elements neither of which are shown but are of conventional construction. As best shown in FIG. 6, the heated disk 72 is driven by a variable speed motor 74, and is positioned so that a radially outer portion of the wheel rotates through a glue pot 76 containing a continuously controlled amount of hot-melt glue. The amount of glue deposited on selected surfaces of the heated disk 72 is controlled by an adjustable doctor blade 78 positioned at the disk exit portion of the glue pot. If desired, a coating of glue may also be formed on the radially outer edge of the heated disk, and such coating then transferred as a longitudinally disposed deposit on the core member 32 as the core member passes through the adhesive applicaton station.

Means 80 are also provided at the adhesive application station 14 for positioning and supporting the free ends 28,30 of respective end pleats 24,26 during the application of adhesive material to one or more of the selected apposite surfaces 54,56 and for further guiding the selected apposite surfaces into contact with the adhesive deposits on the heated disk 72. The positioning means 80 also includes a plurality of elongated bars 82 mounted on the guide plates 64,66 and extending generally parallel to the rotational plane of the disk 72. The finger-like bars 82, however, are mounted at a slight skew angle with respect to the rotational plane of the disk 72 such that the distal end of the bars are closer to the surface of the disk than are the anchored or attached bar ends. The bars 82 thus provide a biased support for a free end 28,30 of one of the end pleats 24,26 when interposed between the bars and the surface of the disk, and as illustrated in FIG. 4, thereby urges the apposite surface 54,56 of the respective free end into contact with adhesive material deposited upon the selected surface area of the heated disk.

Preferably, the assembly machine 10 includes a seam heating station 84 and means 86 at the seam heating station for heating the adhesive joint formed between the apposite surfaces 54,56 of the free ends 28,30 of the end pleats 24,26. The heating means 86 includes a manifold or nozzle 88 arranged to direct a flow of heated air toward the joined free ends subsequent to the deposition of adhesive on one or more of the apposite surfaces 54,56. The manifold is connected to a source of heated air 90, represented by an air supply conduit in FIG. 1. Typically, the air supply conduit is connected to a conventional electrically powered temperature and flow controllable blower, not shown. When the seam heating station 84 is included in the assembly machine 10, as shown in FIG. 1, the chain conveyor 18 is extended so that the pusher arms 20 simultaneously contact the assembled filter and core member and convey the assembled members through the seam heating station.

The assembly machine 10 further includes means 92 at the clamping station 16 for simultaneously clamping the free end 28,30 of respective end pleats 24,26 together and conveying the assembled filter material and core member. The clamping and conveying means 92 includes a plurality of blade members 94 arranged in pairs, serially along a longitudinal axis 96, with each pair of the blade members 94 having one member positioned on each side of the longitudinal axis. A guide bar 98 is disposed co-axially with the longitudinal axis 96. A pair of driven chains 100 are mounted, one on each side of the guide bar 98, and spaced a predetermined distance from the guide bar. The driven chains are restricted against movement in a transverse direction; i.e., restricted against up and down motion in a vertical plane by guide members 102. A plurality of guide rods 104 extend transversely between the paired driven chains and are attached at respective ends to one of the chains. The blade members 94 are slidably mounted in the aforesaid opposed pairs on the guide rods 104 and are movable along the guide rods in a direction toward and away from the longitudinal axis 96. A spring 106 is mounted on each of the guide rods between a respective blade member and associated driven chain and urges the blade member toward the other member of the pair and toward the longitudinal axis 96.

A cam surface 108 is provided at the entry end of the guide bar 98 and acts in cooperation with a cam follower 110 mounted on each of the blade members 94 to move the blades in a direction away from the longitudinal axis 96. As shown in FIG. 7, the cam follower 110 is a roller rotatably mounted on a lower portion of the blade member 94. The contacting surface of the cam follower 110 is maintained in biased contact with the guide bar 98 by action of the springs 106. At desired positions along the clamping and conveying means 92, such as at the entry and exit ends, the transverse thickness of the guide bar 98 in the area of contact by the cam follower 110 is increased by the positioning thereat of the cam surfaces 108. The resultant thicker transverse dimension through the guide bar and cam surfaces forces the cam followers, and consequently the blade members, outwardly away from the longitudinal axis 96 and thereby opens the clamping jaws of the blade member 94. It is desirable to have the blade members in the open position at the entry end of the clamping and conveying means 92 to receive the free ends 28,30 of the respective end pleats 24,26 having adhesive applied therebetween. After opening to receive the adhesively-joined seam of the filter material and core member assembly, the cam surface 108 decreases in thickness in the transverse dimension and controllably permits the clamping jaws of the blade members 94 to close on the seam and clamp the free ends 28,30 between the blade members as shown in FIG. 7. The clamping action on the end pleats is maintained as the filter material and core member assembly is conveyed toward an exit end, not shown, of the clamping and conveying means 92. At the exit end, a second cam surface similar to the entry end cam surface 108 is provided to open the jaws and permit release of the adhesively-joined free ends 28,30 and the assembled filter element.

Industrial Applicability

The filter material and hollow core member assembly machine 10 of the present invention is particularly useful in assembly applications where it is desired to wrap the filter material about the core, adhesively join the free ends of the filter material and maintain a clamping pressure on the adhesively joined seam for a time sufficient to permit curing of the bonded joint. It is now possible to automatically carry out these multiple processes in a single continuous operation.

A method for assembling a pleated filter material and a perforate hollow core member includes the steps of conveying a rectangularly shaped pack of longitudinally pleated filter material 22 having a predetermined number of pleats uniformly spaced between opposed end pleats 24,26, each having a free end 28,30, conveying a perforate hollow core member 32, and bringing the core member 32 into contact with the pleated filter pack 22. After bringing the two elements of the assembly into contact, they are supported one on the other and simultaneously conveyed through a wrapping station 12 and an adhesive application station 14. At the wrapping station 12 the filter material 22 is shaped or formed about the core member 32 and the free ends 28,30 of the end pleats 24,26 of the filter material are brought into juxtaposition i.e. the free ends 28,30 are aligned in closely spaced side by side relationship so that apposite surfaces 54,56 of the free ends face one another. An adhesive material is applied to at least one of the apposite surfaces 54,56 at the adhesive application station 14, after which the apposite surfaces of the free ends 28,30, are clamped together. The assembled filter material and core member is then conveyed while simultaneously maintaining a clamping force on the joined end surfaces for a period of time sufficient to permit curing or setting of the adhesively bonded joint.

Preferably, the method of assembling a filter material 22 and a core member 32 includes separating the free ends 28,30 of each of the end pleats 24,26 from adjacent pleats and supporting the separated free ends during the application of adhesive to the apposite surface of at least one of the free ends. Depending upon the type of adhesive material employed, it may be desirable to apply adhesive to both apposite surfaces 54,56 of the free ends.

In the present embodiment it has been found beneficial to employ a hot-melt glue as the adhesive material. Although the hot-melt glue may be applied from a heated nozzle or gun, it has been found convenient to deposit a controlled amount of hot-melt glue on selected surfaces of a heated disk 72 and then transfer the glue from the heated disk 72 to both of the apposite surfaces 54,56 of the free ends 28,30. If desired, a coating of adhesive can be transferred from the radially outer surface of the heated disk to the surface of the core member 32, simultaneously with the application of adhesive material to the apposite surfaces of the free ends as set forth above. When deposited in such a fashion the adhesive deposits are sufficiently close to each other to bond the free ends of filter material 22 to each other and to the core member 32.

To assure positive contact between one or both of the apposite surfaces 54,56 and the adhesive material application source, it is desirable to support the separated free ends 28,30 of the end pleats 24,26 during the step of applying adhesive material thereto. In the present embodiment, a plurality of elongated bars 82 provide support for the separated free ends 28,30 and bias the apposite surface 54,56 of the free ends toward the adhesive containing surfaces of the heated disk 72. Preferably, the heated disk 72 is rotated at a speed generally consistent with the conveyance rate of the filter material and core member assembly through the adhesive station i.e. the tangential speed of the adhesive containing areas of the heated disk 72 is substantially the same as the linear travel speed of the chain conveyor 18. Thus, the hot-melt glue is uniformly applied to the apposite surfaces 54,56 of the free ends 28,30 while avoiding excessive wiping of the disk surface or build up of hot-melt glue at the leading edge of the free ends.

When employing hot-melt glue as the adhesive material for joining the apposite surfaces 54,56 of the free ends, it may be desirable to apply heat to the surfaces for a period of time after application of adhesive material to increase penetration of the hot-melt glue into the filter material 22. To that end, a source of heated air 90 may be directed through a manifold or nozzle 88 immediately after depositing the hot-melt glue onto one or more of the apposite surfaces 54,56.

Also, depending on the adhesive material and the method of application of such adhesive material other conveyance configurations may be appropriate. For example, it may be desirable to apply an adhesive material to the apposite surfaces with the free ends extending in the vertically upward position rather than vertically downward as shown in the preferred embodiment. In such an application the chain conveyor 18 could be positioned elevationally below the wrapping and adhesive application stations, and the clamping station 16 could also be inverted. Thus, it should be recognized that the particular elevational arrangement of the chain conveyor 18 and the clamping station 16, with respect to the wrapping station 12 and adhesive application station 14, will be dependent on the application in which it is to be used.

Other aspects, objects and advantages of this invention can be obtained from a study of the drawings, the disclosure and the appended claims.

We claim:
1. A machine for assembling a pleated filter and a perforate hollow core member, the machine comprising:
 a wrapping station;

means at said wrapping station for wrapping a rectangularly-shaped pack of longitudinally pleated filter material having a predetermined number of pleats uniformly spaced between opposed end pleats respectively having a free end, into a cylindrical shape about a hollow core member such that the radially inner edges of the pleats are urged into contact with said core member and said free ends of the pleats are brought into juxtaposition;

an adhesive application station;

means at said adhesive application station for applying an adhesive material to a preselected apposite surface of at least one of the free ends;

means for conveying the pleated filter material and the core member together in one direction sequentially through said wrapping station and said adhesive application station;

a clamping station; and, means at said clamping station for simultaneously clamping the free end of said end pleats together and conveying the filter material and core member assembly while continuing said clamping together of the free ends.

2. A machine for assembling a pleated filter and a perforate hollow core member, as set forth in claim 1, wherein said means for wrapping the filter material about a core includes:

a plurality of guide members arranged in converging relationship from an entry end to an exit end of said wrapping station at which said guide members are so arranged to wrap the rectangularly-shaped filter pack into an annulus about the core member and urge the radially inner pleated edges of the annularly disposed filter material into intimate contact with the outer surface of the hollow core member, a longitudinal guide bar extending through said wrapping station;

a pair of guide plates extending generally parallel with respect to said longitudinal guide bar and disposed respectively on opposite lateral sides of said longitudinal guide bar in closely spaced relationship thereto; and a plurality of rollers mounted in spaced relationship to said longitudinal guide bar and cooperating with said guide members to urge the inner edges of the pleats of the filter material into contact with said core member.

3. A machine for assembling a pleated filter and a perforate hollow core member, as set forth in claim 1, wherein the machine includes means at said adhesive application station for positioning and supporting the free ends of said end pleats during the application of adhesive material to the preselected apposite surface of said at least one free end and for urging said apposite surface into contact with said adhesive.

4. A machine for assembling a pleated filter and perforate hollow core member, as set forth in claim 3, wherein said means at said adhesive application station for applying an adhesive material includes:

a heated disk rotatably mounted at said adhesive application station for rotation in a plane parallel with and centered between the apposite surfaces of the juxtaposed free ends of the end pleats when said pleats are positioned at said station;

means for rotating said heated disk;

a source of adhesive material; and means for applying a predetermined amount of adhesive on selected surface areas of said heated disk.

5. A machine for assembling a pleated filter and a perforate hollow core member, as set forth in claim 4, wherein said means at said adhesive application station for positioning and supporting the free ends of said end pleats includes a plurality of elongated bars, said bars being biased for movement toward said heated disk and so arranged to urge the apposite surface of said preselected free end into contact with said adhesive-containing surface area of the heated disk when said at least one free end is interposed said bars and said disk.

6. A machine for assembling a pleated filter and a perforate hollow core member, as set forth in claim 1, wherein said machine includes:

a seam heating station; and, means at said seam heating station for heating the adhesive joint formed between the apposite surfaces of the free ends of the end pleats.

7. A machine for assembling a pleated filter and a perforate hollow core member, as set forth in claim 6, wherein said means at the seam heating station for heating said joint includes:

a source of heated air;

nozzle means for directing a flow of heated air toward the free ends of said end pleats subsequent to the deposition of adhesive on the preselected apposite surface of at least one of the free ends; and, means for conveying the assembled filter and core member through said adhesive curing station.

8. A machine for assembling a pleated filter and a perforate hollow core member, as set forth in claim 1, wherein said means at the clamping station for simultaneously clamping the free end of each of said end pleats together and conveying the filter material and core member assembly includes:

a plurality of blade members arranged in pairs, serially along a longitudinal axis, each pair of the blade members having one member disposed on each side of said longitudinal axis;

a guide bar disposed coaxially with said longitudinal axis;

a pair of driven chains, one of each chain in said pair being disposed on opposite sides of said guide bar and spaced a predetermined distance therefrom, and restricted against movement in a direction transverse to said longitudinal axis;

a plurality of guide rods extending transversly between each of said driven chains and attached at respective ends to one of said chains, said blade members being slidably mounted in opposed pairs on said guide rods and movable along said guide rods in a direction toward and away from said longitudinal axis;

bias means to urge each of said blade members in an opposed pair toward each other and said longitudinal axis;

a cam surface on said selected portions of said guide bar; and, a cam follower mounted on each of said blade members, said cam follower acting in cooperation with said cam surface on the guide bar to move said blade members in a direction away from said longitudinal axis.

9. A method for assembling a pleated filter material and a perforate-hollow core member, including the steps of:

conveying a rectangularly-shaped pack of longitudinally pleated filter material having a predetermined number of pleats uniformly spaced between opposed end pleats each having a free end;

conveying a perforate hollow core member and bringing said core member into contact with said pleated filter pack;

supporting a selected one of said filter pack and said core member on the other, and simultaneously conveying said pack of filter material and said core member through a wrapping station and an adhesive application station;

forming said pack of filter material about the core member and bringing the free ends of the end pleats into juxtaposition;

applying an adhesive material to an apposed surface of at least one of the juxtaposed free ends;

clamping together the apposite end surface of each of the end pleats; and, simultaneously conveying the assembled pack of filter material and core member, and maintaining the clamping force on the joined end surfaces for a period of time sufficient to permit curing of the adhesively bonded joint therebetween.

10. A method for assembling a pleated filter material and a core member, as set forth in claim 9, wherein said method includes the steps of separating the free end of each of the end pleats from adjacent pleats and supporting said separated free ends during the step of applying adhesive to said apposite surface of at least one of the free ends.

11. A method for assembling a pleated filter material and a core member, as set forth in claim 9, wherein the method includes applying an adhesive material to the apposite surfaces of each free end of the end pleats.

12. A method for assembling a pleated filter material and a core member, as set forth in claim 9, wherein said method includes applying an adhesive material to said core member simultaneously with the application of an adhesive material on said apposite surface, said adhesive material on said core member and on said apposite surface being applied in sufficiently close proximity to each other to bond the end pleats of the pleated filter material to the core member.

13. A method for assembling a pleated filter material and a core member, as set forth in claim 9, wherein the method includes heating a hot-melt glue and applying said hot-melt glue while in a liquid state to said apposite surface of at least one of the free ends.

14. A method for assembling a pleated filter material and a core member, as set forth in claim 13, wherein said method includes depositing a controlled amount of hot-melt glue on selected surfaces of a heated disk, and transferring said glue from the heated disk to the juxtaposed facing surfaces of the free ends of the end pleats.

15. A method for assemblying a pleated filter material and a core member, as set forth in claim 13, wherein subsequent to the step of applying said hot-melt glue to said apposite surface, said method includes the step of heating the apposite surface for a period of time sufficient to increase penetration of said hot-melt glue into the filter material.

* * * * *